United States Patent [19]

Cianflone

[11] Patent Number: 4,878,237
[45] Date of Patent: Oct. 31, 1989

[54] SHOULDER CRADLE FOR SUPPORTING A CELLULAR CAR PHONE

[76] Inventor: Stephen P. Cianflone, 113 Sharbot Dr., Pittsburgh, Pa. 15237

[21] Appl. No.: 275,344

[22] Filed: Nov. 23, 1988

[51] Int. Cl.$^4$ ............................................. H04Q 7/04
[52] U.S. Cl. ........................................ 379/58; 379/446; 455/90
[58] Field of Search ................. 379/58, 446, 441, 455, 379/449; 456/90

[56] References Cited

U.S. PATENT DOCUMENTS

| | | | |
|---|---|---|---|
| D. 130,067 | 10/1941 | Epstein . | |
| D. 170,086 | 7/1953 | Harmon | D26/14 |
| D. 172,061 | 4/1954 | Renneker | D26/14 |
| D. 187,648 | 4/1960 | Van Dyke | D26/14 |
| D. 188,189 | 6/1960 | Renneker | D26/14 |
| D. 215,006 | 8/1969 | Behring | D26/14 |
| D. 224,543 | 8/1972 | Leopoldi | D26/14 |
| D. 231,620 | 5/1974 | Van Dyke | D26/14 |
| 3,056,862 | 12/1962 | Renneker | 179/157 |
| 3,141,072 | 7/1964 | Neilsen | 179/157 |
| 3,163,722 | 12/1964 | Gomez | 179/157 |
| 3,435,158 | 3/1969 | Darrasse | 179/157 |
| 3,582,574 | 6/1971 | Grau | 179/157 |
| 3,830,987 | 8/1974 | Van Dyke | 179/157 |
| 4,058,689 | 11/1977 | Stebinger | 179/157 |
| 4,759,058 | 7/1988 | Sutton | 379/449 |

Primary Examiner—Robert Lev
Attorney, Agent, or Firm—George Raynovich, Jr.

[57] ABSTRACT

A shoulder cradle for supporting a cellular car phone on the shoulder of a vehicle operator is provided. The shoulder cradle is fitted onto the cellular car phone to permit access to the cellular car phone dial keyboard when the shoulder cradle is not being utilized to support the car phone on the shoulder of the phone user. When the shoulder cradle is being utilized to support the car phone on the shoulder of the phone user, the shoulder cradle covers a substantial portion of the area occupied by the dial keyboard on the car phone. The shoulder cradle is formed from lightweight materials and has design features to reduce the weight. The shoulder cradle may be adhesively attached to the car phone so that the casing of the car phone is not marred or damaged by installation of the shoulder cradle.

20 Claims, 2 Drawing Sheets

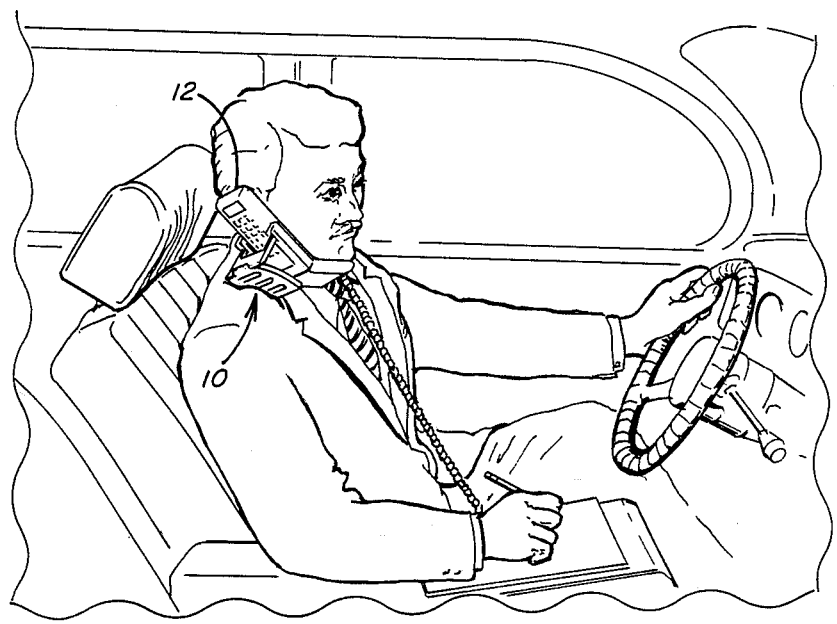
FIG. 1
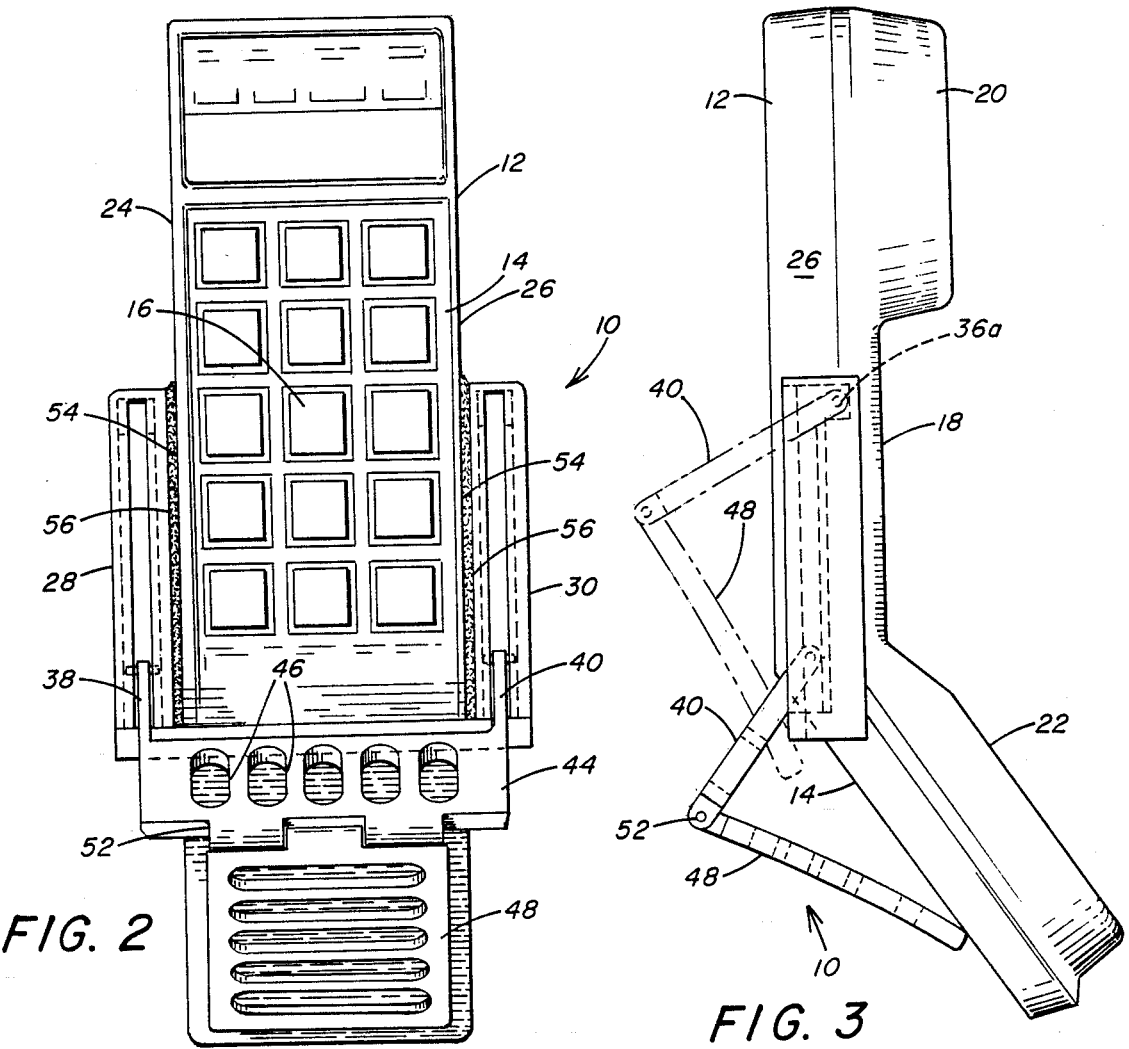
FIG. 2
FIG. 3

SHOULDER CRADLE FOR SUPPORTING A CELLULAR CAR PHONE

BACKGROUND OF THE INVENTION

1. Field of the Invention

This invention relates to a shoulder cradle for supporting a cellular car phone on the shoulder of the user of the car phone so that the user's hands are free.

2. Description of the Prior Art

It is well known to provide various types of shoulder supports for standard telephone handsets so that the users of the standard telephone handsets have their hands free to take messages, to do work at their desks, or perform similar activities while talking on the telephone. The standard telephone handset has a gently curved hand piece with an earphone at one end and a mouthpiece at the other end. The shoulder supports for those handsets are generally attached to the gently curved hand piece of the handset.

It is also well known to provide shoulder supports for telephone handsets that have pivoting portions to fold the shoulder supports against the handset when not in use. U.S. Pat. Nos. 3,141,072, 3,582,574, and U.S. Design Pat. No. 224,543 all disclose shoulder supports for telephone handsets that are pivotally connected to the handsets so that they may be positioned against the handsets when not in use.

U.S. Pat. Nos. 3,056,862, 3,163,722, 3,830,987 and 4,058,689 all disclose relatively elaborate shoulder supports for telephone handsets that may be utilized with standard telephones.

The shoulder supports that can be utilized with standard conventional telephone handsets are generally not adaptable to car phones. The cellular car phones that have been utilized in recent years consist of a hand held unit which has a dial keyboard on one surface and has an earphone and a mouthpiece on the opposite surface of the unit so that the dial keyboard occupies the position to which conventional shoulder supports are commonly attached. Even though the ability to converse over a car phone without the driver holding it is more critical than is hands-off operation of a conventional telephone handset, the arrangement of parts to provide a shoulder cradle for a car phone is complicated by the structure of the car phone since accommodations must be made to permit access to the dial keyboard of the car phone while, at the same time, permitting that area to be occupied by the shoulder cradle when conversing on the car phone.

There is, therefore, a need for a shoulder cradle that can be utilized with a car phone to permit the driver of a vehicle to converse over the car phone while, at the same time, having both hands free.

SUMMARY OF THE INVENTION

In accordance with the present invention, there is provided a shoulder cradle for supporting a cellular car phone having a keybord on a first surface, an earphone and mouth piece on a second surface, and third and fourth side surfaces parallel to each other connecting the first and second surfaces to form the cellular car phone. The shoulder cradle has first and second channels that are secured to the third and fourth surfaces, respectively, of the car phone. First and second pivoting arms are slidable in the first and second channels and are pivotally secured within the first and second channels. A crosspiece is fixed to the first and second pivoting arms so that the crosspiece and the first and second pivoting arms move as a unit. A cradle member is secured by hinges to the crosspiece. The first and second channels, the pivoting arms and the crosspiece are positioned so that the car phone keyboard is framed by the pivoting arms and the crosspiece whereby access to the keyboard is not impeded when the shoulder cradle is not in use. The pivoting arms are slid and pivoted in the channels to a locked position whereby the crosspiece and the cradle member cover a substantial portion of the keyboard when the shoulder cradle is in use to support the car phone on the shoulder of a phone user.

The shoulder cradle may be adhesively secured to the car phone so as not to mar or dent the car phone casing. The shoulder cradle may be formed of either rigid plastic material or aluminum since it is essential to have the shoulder cradle be relatively light in weight.

The weight of the shoulder cradle may also be lightened by forming cut-out openings in the crosspiece and in the cradle member. The cut-out portions of the cradle member may also serve to increase the friction between the shoulder of the phone user and the shoulder cradle to prevent slippage of the cellular car phone while in use.

Accordingly, the principal object of the present invention is to provide a lightweight shoulder cradle to be utilized particularly with a cellular car phone.

Another object of the present invention is to provide a shoulder cradle for a cellular car phone that permits access to the car phone dial keyboard when the shoulder cradle is not in use and utilizes the area of the keyboard by covering a substantial portion of it when the shoulder cradle is in use.

A further object of the present invention is to provide a shoulder cradle for supporting a cellular car phone that may be attached to the cellular car phone without marring or damaging the casing of the cellular car phone.

These and other objects of the present invention will be more completely disclosed and described in the following specification, the accompanying drawings, and the appended claims.

BRIEF DESCRIPTION OF THE DRAWINGS

FIG. 1 is a perspective view of the shoulder cradle of the present invention being utilized to support a car phone on the shoulder of a vehicle operator.

FIG. 2 is a front elevation of a car phone having the shoulder cradle of the present invention installed thereon.

FIG. 3 is a side elevation of the car phone on Figure 2 with the shoulder cradle installed.

DESCRIPTION OF THE PREFERRED EMBODIMENT

Figure 4:
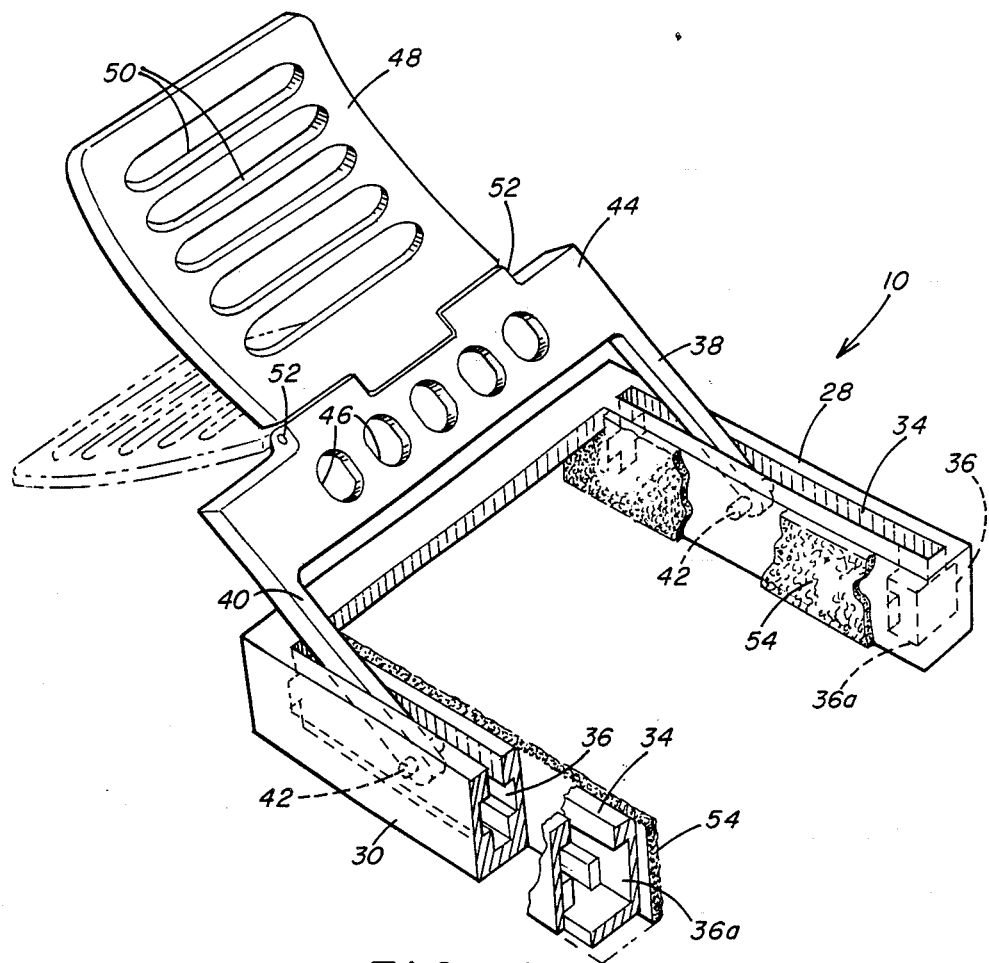
FIG. 4 is a perspective view of the shoulder cradle of the present invention without the car phone and with certain parts broken away for clarity.

Referring to the drawings there is indicated generally a shoulder cradle 10 for supporting a cellular car phone 12 so that the operator of the vehicle in which the car phone is installed may have both hands free while conversing on the car phone.

The car phone 12 has a first surface 14 on which is located a dial keybod 16 by which the phone numbers to be called may be dialed on the car phone. A second surface 18 on the opposite side of the car phone 12 has an earphone 20 and a mouthpiece 22 formed thereon. Third surface 24 and fourth surface 26 of the car phone are generally parallel to each other and connect the surfaces 14 and 18. The car phone 12, as described, is a generally available standard car phone and forms no part of the present invention.

The shoulder cradle 10 has a first channel 28 and a second channel 30 which are generally parallel to each other. As best seen in FIG. 4, the channels 28 and 30 each have grooves 34 extending substantially the entire length of channels 28 and 30. In addition to grooves 34, the channel 28 and 30 each have undercut grooves 36 that are formed perpendicularly to grooves 34.

Shoulder cradle 10 has a first pivoting arm 38 and a second pivoting arm 40 each of which have pivot pins 42 (FIG. 4) fixed in the respective ends of the pivoting arms 38 and 40. The pivoting arms 38 and 40 are slidably received within the grooves 34 in channels 28 and 30, respectively, and the pivot pins 42 are disposed within undercut grooves 36 formed in channels 28 and 30, respectively, so that pivoting arms 38 and 40 may slide relative to channels 28 and 30 and may also pivot about pivot pins 42 relative to channels 28 and 30. As seen in FIG. 4, the channels 28 and 30 may be connected to channel connection 32, although channel connection 32 is not always necessary in practicing the present invention.

The pivoting arms 38 and 40 are connected to each other by crosspiece 44 so that pivoting arms 38 and 40 and crosspiece 44 move together as a unit. The crosspiece 44 has several cut-out areas 46 which reduce the weight of the shoulder cradle 10, but do not structurally weaken the unit. As shown in the drawings, crosspiece 44 is formed integrally with pivoting arms 38 and 40, but crosspiece 44 could also be made to be adjustable relative to pivoting arms 38 and 40 so that car phones of varying widths can be accommodated by the shoulder cradle 10.

A cradle member 48 having cut-out areas 50 is secured to crosspiece 44 by hinges 52 so that the cradle member 48 may pivot relative to crosspiece 44 about hinges 52. The cut-out areas 50 on cradle member 48 serve to reduce the weigt of the unit and also serve to form a semi-corrugated surface on cradle member 48 which increases the friction between cradle member 48 and the shoulder of the car phone user to enhance the supporting capabilities of the shoulder cradle 10.

As best seen in FIG. 4, the channels 28 and 30 each have velcro strips 54 adhesively secured to them. As may be seen in FIG. 2, the car phone 12 also has velcro strips 56 adhesively secured to the third surface 24 and the fourth surface 26 so that the velcro strips 54 on the channels 28 and 30 may adhere to the velcro strips 56 on the car phone 12 to thereby removably secure the shoulder cradle 10 to the car phone 12.

It should be appreciated that shoulder cradle 10 can also be adhesively secured directly to the car phone 12 without velcro strips 54 and 56 by adhesively securing the channels 28 and 30 directly to the car phone 12. It is preferable to adhesively secure the shoulder cradle 10 to the car phone 12 so that the car phone 12 is not marred, damaged, drilled with holes, or otherwise defaced. Since the car phone 12 is often a leased item, it must be returned in good condition.

As best seen in FIGS. 2 and 3, the shoulder cradle 10 is positioned on the car phone so that when the pivoting arms 38 and 40 are slid to their lowest position as viewed in FIGS. 2 and 3 and the pivoting arms are pivoted toward the car phone body, the crosspiece 44 is below the car phone dial keyboard 16 and the pivoting arms 38 and 40 and the crosspiece 44 frame the dial keyboard 16 so that access to the dial keyboard 16 is unimpeded. Further, the cradle member 48 is pivoted about hinges 52 so that it contacts the first surface 14 of the car phone 12 and is out of the way.

When it is desired to utilize the cradle 10 as shown in FIG. 1, the pivoting arms 38 and 40 are slid upwardly as viewed in FIG. 3 and pivoted outwardly from the first surface 14 of car phone 12 as shown in the phantom position in FIG. 3. The pins 42 enter the end grooves 36a below the depth of grooves 34 and the pivoting arms 38 and 40 abut the intersection of grooves 34 and 36a to thereby lock the pivoting arms 38 and 40 in the position shown in phantom in FIG. 3. The cradle member 48 is then pivoted down against the surface 14 as shown in phantom in FIG. 3. When the pivoting arms 38 and 40 and the cradle member 48 assume the position shown in phantom in FIG. 3, they cover a substantial portion of the dial keyboard 16 which, of course, is not in use while the phone user is conversing on the telephone. When it is desired to return the cradle 10 to the idle position, the pivotong arms 38 and 40 are pulled outwardly to remove the pins 42 from the end grooves 36a and pins 42 once again enter the grooves 36 where they may be slid so that pivoting arms 38 and 40 assume the idle position.

As may be seen in the drawings, the cradle member 48 is formed with a gentle curve to accommodate the shoulder of the phone user. The exact shape of cradle member 48 may be modified in manufacture and made, in some instances, merely to be a flat member. The parts of the shoulder cradle 10 are preferably formed from lightweight rigid plastic or from aluminum since it is desirable to have the shoulder cradle 10 as light in weight as possible consistent with sufficient structural strength to perform its function. In some instances, some parts of the same shoulder cradle may be formed of plastic and other parts of aluminum.

According to the provisions of the Patent Statutes, I have explained the principle, preferred construction and mode of operation of my invention and have illustrated and described what I now consider to represent its best embodiment. However, it should be understood that, within the scope of the appended claims, the invention may be practiced otherwise than as specifically illustrated and described.

I claim:

1. A shoulder cradle for supporting a cellular car phone having a key board on a first surface, an earphone and mouthpiece on a second surface, and third and fourth side surfaces parallel to each other connecting said first and second surfaces comprising:

a first channel secure to said car phone third surface;
a second channel secured to said car phone fourth surface;
first and second pivoting arms slidable in said first and second channels, respectively, and pivotally secured therein;
a crosspiece secured to said first and second pivoting arms so that said crosspiece and said first and second pivoting arms move as a unit;
a cradle member hingedly secured to said crosspiece;
said first and second channels, said pivoting arms and said crosspiece being positioned so that said car phone keyboard is framed by said pivoting arms and said crosspiece whereby access to said keyboard is not impeded when said shoulder cradle is not in use; and said pivoting arms being slid and pivoted in said channels to a locked position where said crosspiece and said cradle member cover a substantial portion of said keyboard when said shoulder cradle is in use to support said car phone on the shoulder of a phone user.

2. The shoulder cradle of claim 1 wherein said first and second channels are parallel to each other when secured to said car phone.

3. The shoulder cradle of claim 1 wherein said first and second channels are adhesively secured to said car phone.

4. The shoulder cradle of claim 1 wherein velcro strips are adhesively secured to said car phone third and fourth surfaces and velcro strips are adhesively secured to said first and second channels so that said shoulder cradle may be attached to, and removed from, said car phone by engagement and disengagement of said velcro strips.

5. The shoulder cradle of claim 1 wherein said first and second channels, said first and second pivoting arms, said crosspiece, and said cradle member are formed from a rigid plastic material.

6. The shoulder cradle of claim 1 wherein said first and second channels, said first and second pivoting arms, said crosspiece, and said cradle member are formed from aluminum.

7. The shoulder cradle of claim 1 wherein said crosspiece has cut-out openings to reduce the weight of said crosspiece.

8. The shoulder cradle of claim 1 wherein said cradle member has cut-out openings to reduce the weight of said cradle member and to increase the friction between said cradle member and the shoulder of a car phone user.

9. The shoulder cradle of claim 1 wherein said crosspiece and said cradle member both have cut-out openings to reduce the weight thereof and to increase the friction between said cradle member and the shoulder of a car phone user.

10. The shoulder cradle of claim 1 wherein said cradle member has a curvature formed therein to better accommodate the shoulder of a car phone user.

11. A shoulder cradle for supporting a cellular car phone on the shoulder of a phone user, said cellular car phone including a keyboard on a first surface, an earphone and mouthpiece on a second surface, and third and fourth side surfaces parallel to each other connecting said first and second surfaces, said shoulder cradle comprising:

a first elongated channel adhesively secured to said car phone third surface;

a second elongated channel adhesively secured to said car phone fourth surface;

said first and second elongated channels being of the same length and being parallel to each other when secured to said car phone;

first and second pivoting arms slidably and pivotally secured within said first and second channels, respectively, for sliding and pivotal movement relative to said channels;

a crosspiece formed integrally with said first and second pivoting arms so that said crosspiece and said pivoting arms are a single unit;

a plurality of cut-out areas in said crosspiece to reduce the weight of said crosspiece;

a cradle member secured by hinges to said crosspiece so that said cradle member may be pivoted relative to said crosspiece;

a plurality of transverse cut-out areas in said cradle member to reduce the weight of said cradle member and to increase the friction between said cradle member and the shoulder of said phone user;

said first and second elongated channels, said pivoting arms and said crosspiece being positioned so that said car phone keyboard is framed by said pivoting arms and said cross-piece whereby access to said keyboard is not impeded when said shoulder cradle is not in use; and said pivoting arms being slid and pivoted in said elongated channels to a locked position and said cradle member being pivoted relative to said crosspiece to a position where said crosspiece and said cradle member cover a substantial portion of said keyboard when said shoulder cradle is in use to support said car phone on the shoulder of said phone user.

12. The shoulder cradle of claim 11 wherein velcro strips are adhesively secured to said car phone third and fourth surfaces and velcro strips are adhesively secured to sid first and second channels so that said shoulder cradle may be attached to, and removed from, said car phone by engagement and disengagement of said velcro strips.

13. The shoulder cradle of claim 11 wherein said first and second channels, said first and second pivoting arms, said crosspiece, and said cradle member are formed from a rigid plastic material.

14. The shoulder cradle of claim 11 whereinsaid first and second channels, said first and second pivoting arms, said crosspiece, and said cradle member are formed from aluminum.

15. The shoulder cradle of claim 11 wherein said cradle member has a curvature formed therein to better accommodate the shoulder of a car phone user.

16. The shoulder cradle of claim 11 wherein some of the parts are made of a rigid plastic material and some of the parts are made of aluminum.

17. The shoulder cradle of claim 11 wherein said first and second elongated channels each have undercut grooves formed within said channels to receive pins formed on said first and second pivoting arms to retain said pivoting arms within said channels for sliding and pivoting movement of said pivoting arms relative to said channels.

18. The shoulder cradle of claim 11 wherein said pivoting arms are slid to the position in said channels farthest away from the end of said car phone having said earphone thereon and pivoted so that said crosspiece lies adjacent said car phone first surface when said shoulder cradle is not in use.

19. The shoulder cradle of claim 11 wherein said pivoting arms are slid to the position in said channels closest to the end of said car phone having said earphone thereon and pivoted so that said crosspiece is moved outwardly away from said car phone first surface when said shoulder cradle is being used to support said car phone on the shoulder of said phone user.

20. The shoulder cradle of claim 11 wherein said first and second elongated channels each have undercut grooves formed within said channels to receive pins formed on said first and second pivoting arms to retain said pivoting arms within said channels for sliding and pivoting movement of said pivoting arms relative to said channels and said undercut grooves have end grooves formed to receive said pins whereby said first and second pivoting arms are locked inan extended position away from said channels.

* * * * *